United States Patent
Ng

(10) Patent No.: US 8,210,946 B2
(45) Date of Patent: Jul. 3, 2012

(54) PROCESS VARYING DEVICE AND METHOD

(75) Inventor: Chem Ann Ng, Singapore (SG)

(73) Assignee: Razer (Asia-Pacific) Pte Ltd, Singapore (SG)

( * ) Notice: Subject to any disclaimer, the term of this patent is extended or adjusted under 35 U.S.C. 154(b) by 230 days.

(21) Appl. No.: 12/293,662

(22) PCT Filed: Sep. 19, 2007

(86) PCT No.: PCT/SG2007/000318
§ 371 (c)(1),
(2), (4) Date: Sep. 15, 2009

(87) PCT Pub. No.: WO2009/038538
PCT Pub. Date: Mar. 26, 2009

(65) Prior Publication Data
US 2010/0137065 A1 Jun. 3, 2010

(51) Int. Cl.
*A63F 9/24* (2006.01)
(52) U.S. Cl. .............. 463/37; 463/38; 463/39
(58) Field of Classification Search ............ 463/37, 463/38, 39
See application file for complete search history.

(56) References Cited

U.S. PATENT DOCUMENTS

| | | | |
|---|---|---|---|
| 5,970,430 A * | 10/1999 | Burns et al. | 702/122 |
| 2003/0196824 A1* | 10/2003 | Gass et al. | 173/131 |
| 2005/0245303 A1* | 11/2005 | Graepel et al. | 463/1 |
| 2010/0249669 A1* | 9/2010 | Ulric et al. | 601/2 |

* cited by examiner

*Primary Examiner* — Pierre E Elisca
(74) *Attorney, Agent, or Firm* — Vedder Price P.C.

(57) ABSTRACT

In accordance with an embodiment of the invention, a human interface device communicable with a computing device and method therefor for varying a process selectably performable by the computing device is disclosed. The human interface device comprises a positionally variable controller of the human interface device actuable and positionable by a user of the human interface device. The human interface device also has a communication interface for communicating with the computing device for varying intensity level of an intensity-variable property of the process selectably performable by the computing device in response to the actuation and position of the positionally variable controller. More specifically, the process is selectably performable by the computing device is selectable by at least one process selection key actuable by the user of the human interface device.

16 Claims, 3 Drawing Sheets

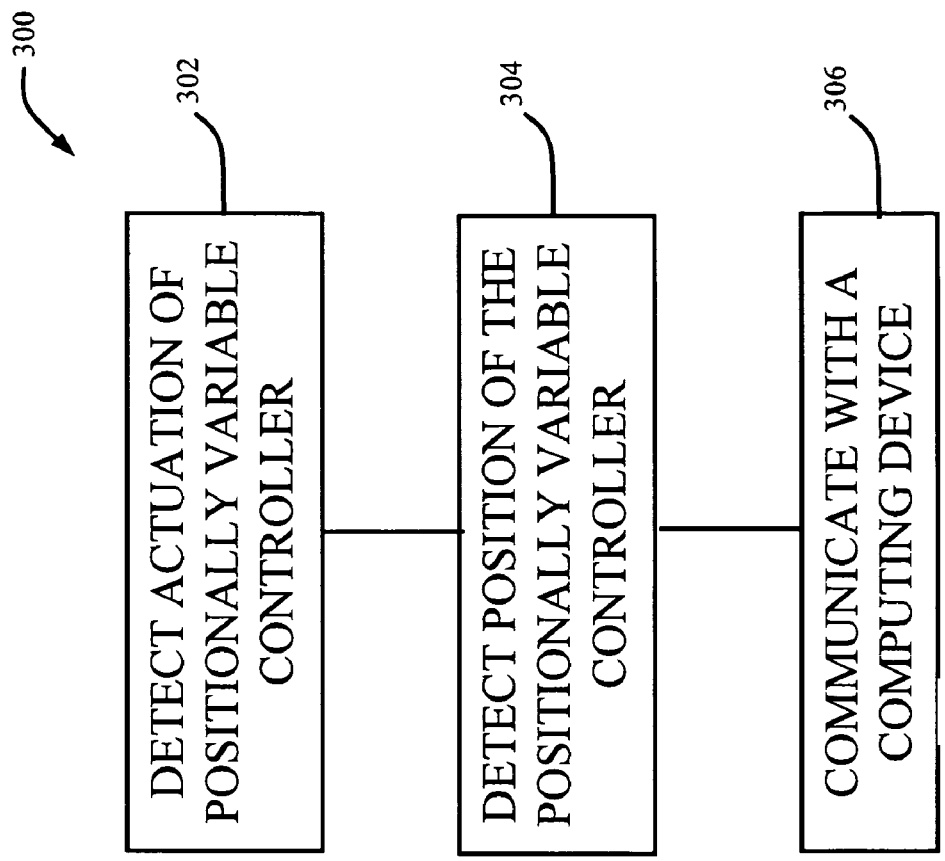

PROCESS VARYING DEVICE AND METHOD

FIELD OF INVENTION

The invention relates generally to interface devices. In particular, the invention relates to a device for varying a process performable by a computing device.

BACKGROUND

An input device such as a mouse usually has a scrolling button that is freewheeled and rotatable by the fingers of a user. When viewing a webpage on a computer monitor for example, the scrolling button enables the user to scroll up or down the webpage for viewing the full contents contained therein.

The mouse is also typically used in conjunction with other input devices such as a keyboard for playing computer games. In certain computer games, for example, games involving combat fighting, a gamer is often required to vary the intensity level of a function, such as the strength of a punch or power intensity of a weapon when engaging an opponent. The scrolling button of the mouse is often used in this case to provide the variation in strength or intensity necessary for engaging the opponent.

A change in the direction of rotation of the scrolling button usually corresponds to a switch from either increasing or decreasing the strength or intensity. The strength or intensity is then further increased or decreased by rotating the scrolling button in either the clockwise or counter-clockwise direction.

Alternatively, certain pre-assigned keys found on a keyboard are used to perform the variation in strength or intensity. Usually, at least two keys are required to perform the variation. One pre-assigned key is used for increasing the strength or intensity while another pre-assigned key is used for decreasing the strength or intensity.

However, a conventional mouse or keyboard is undesirable for computer games that require a gamer to vary the strength or intensity in a very short period of time. The scrolling button of the conventional mouse or the pre-assigned keys of the conventional keyboard do not sufficiently allow a gamer to respond to situations during the game where a very quick change in the strength or intensity is necessary. This would undesirably affect the play and performance of the gamer.

There is therefore a need for a device and method that would allow a user to respond to situations where a very quick change in the intensity level of a function in a computer game is necessary.

SUMMARY

Embodiments of the invention disclosed herein provide a device and method that would allow a user to respond to situations where a very quick change in the intensity level of a function in a computer game is necessary.

Therefore, in accordance with a first embodiment of the invention, in human interface device communicable with a computing device, a method for varying a process selectably performable by the computing device is disclosed. The method involves detecting actuation of a positionally variable controller of the human interface device by a user of the human interface device. The method also involves detecting position of the positionally variable controller in response to the actuation of the positionally variable controller. The method further involves communicating with the computing device for varying intensity level of an intensity-variable property of the process selectably performable by the computing device in response to the position of the positionally variable controller. More specifically, the process is selectably performable by the computing device is selectable by at least one process selection key actuable by the user of the human interface device.

In accordance with a second embodiment of the invention, a human interface device communicable with a computing device for varying a process selectably performable by the computing device is disclosed. The human interface device comprises a positionally variable controller actuable and positionable by a user of the human interface device. The human interface device also has a communication interface for communicating with the computing device for varying intensity level of an intensity-variable property of the process selectably performable by the computing device in response to the actuation and position of the positionally variable controller. More specifically, the process is selectably performable by the computing device is selectable by at least one process selection key actuable by the user of the human interface device.

BRIEF DESCRIPTION OF THE DRAWINGS

Embodiments of the invention are described hereinafter with reference to the drawings, in which:

FIG. 3 is a flow diagram of a method for varying a process performable by the computing device of FIG. 1 according to another embodiment of the invention.

DETAILED DESCRIPTION

Figure 1:
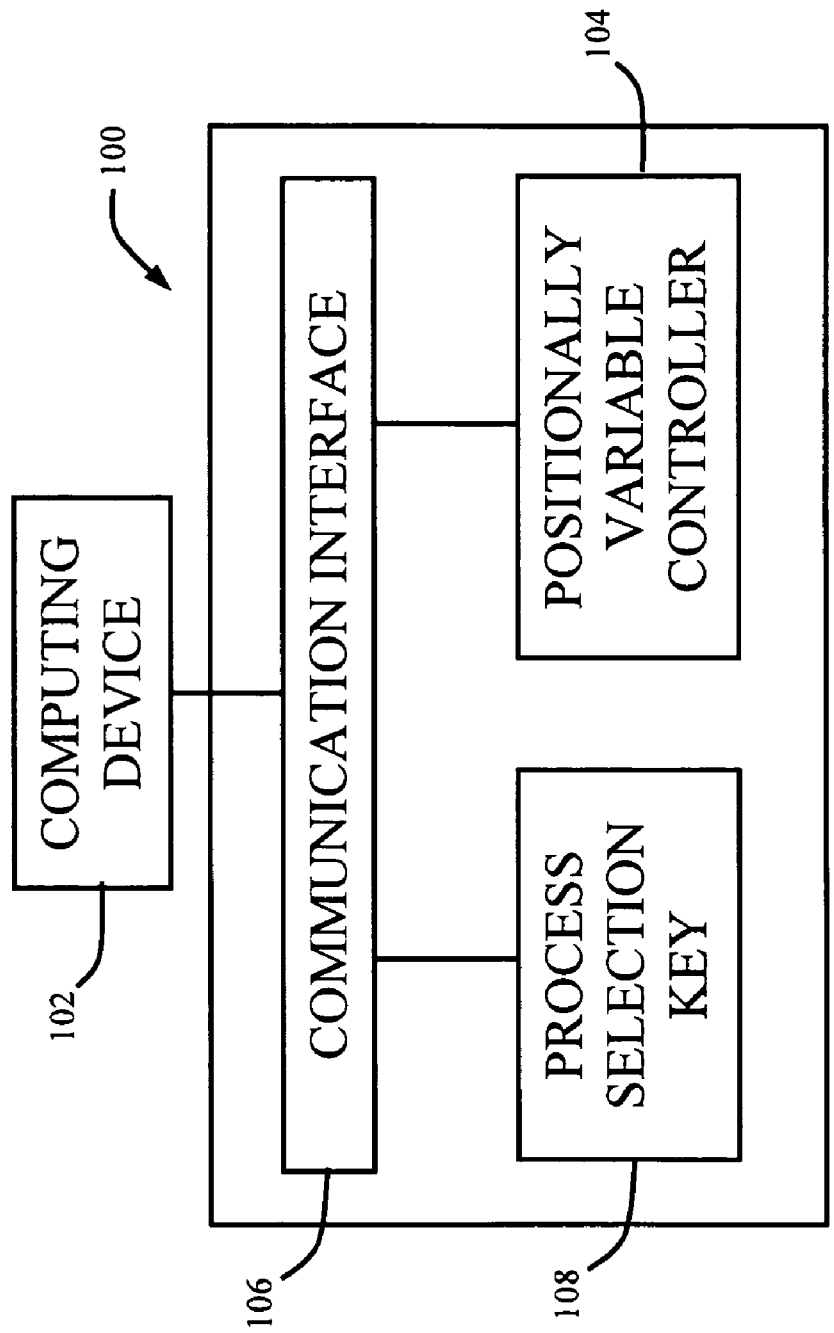
FIG. 1 is a schematic view of a human interface device for varying a process performable by the computing device according to an embodiment of the invention.

With reference to the drawings, embodiments of the invention for providing a device and method that would allow a user to respond to situations where a very quick change in the intensity level of a function in a computer game is necessary are described hereinafter.

A conventional mouse or keyboard is undesirable for computer games that require a gamer to vary the strength or intensity in a very short period of time. The scrolling button of the conventional mouse or the pre-assigned keys of the conventional keyboard do not sufficiently allow a gamer to respond to situations during the game where a very quick change in the strength or intensity is necessary. This would undesirably affect the play and performance of the gamer.

For purposes of brevity and clarity, the description of the invention is limited hereinafter to applications related to providing a device and method that would allow a user to respond to situations where a very quick change in the intensity level of a function in a computer game is necessary. This however does not preclude embodiments of the invention from other areas of application that facilitates controlling of the intensity level of a function in a software application. For example, embodiments of the invention facilitate controlling of a graphic function such as colour tone or intensity in a graphic application. The functional and operational principles upon which embodiments of the invention are based remain the same throughout the various embodiments.

Embodiments of the invention are described in greater detail hereinafter in accordance to illustrations provided in FIGS. 1 to 3 of the drawings, wherein like elements are identified with like reference numerals.

With reference to FIG. 1, a schematic view of a human interface device 100 according to a first embodiment of the invention is shown. The human interface device 100 is able to communicate with a computing device 102 for varying a process that is performable by the computing device 102.

An example of such a human interface device 100 is a mouse or keyboard. The mouse or keyboard is typically used as an input device that is coupled to the computing device 102 such a desktop or laptop computer.

The process is an action or event in an application operating in the computing device 102. For example, the process is an in-game effect of a combat game that involves fighting. A user playing the combat game usually controls a figure that engages one or more opponents during the game. During fighting, the figure throws out a punch at an opponent. The strength of the punch is an example of an intensity-variable property of the punch, or the in-game effect of the combat game. This means that the strength of the punch is variable and capable of being varied by the user via the human interface device 100.

In the foregoing example, the strength of the punch is preferably variable between a first intensity level and second intensity level by a positionally variable controller 104 of the human interface device 100. The positionally variable controller 104 is tactile and is preferably capable of being actuated and positioned by the user of the computing device 102.

In another example, the process is a function or in-program effect in a software application such as Microsoft PAINT™ or Microsoft POWERPOINT™ operating in the computing device 102. The process involves varying the colour intensity of a picture drawn using Microsoft PAINT™ or changing the font size of a text heading in a Microsoft POWERPOINT™ slide through the use of the positionally variable controller 104.

Figure 2B:
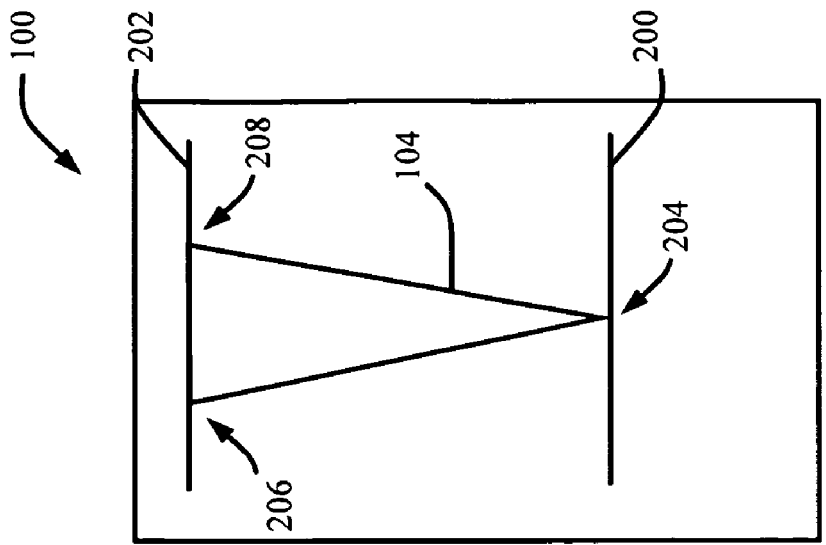
FIGS. 2a and 2b are plan views of a positionally variable controller of the human interface device of FIG. 1 according to two different embodiments of the invention.
Figure 2A:
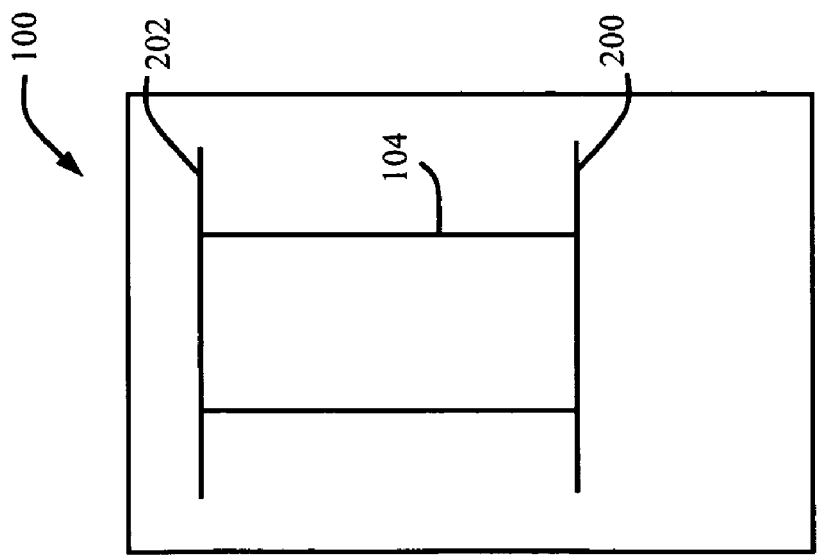

With reference to FIG. 2a, a plan view of the positionally variable controller 104 is shown. The positionally variable controller 104 is preferably a touch-sensitive portion of the human interface device 100 for example. In the touch-sensitive portion example, the positionally variable controller 104 is a solid-state sensor. The solid-state sensor is preferably a capacitive sensor known in the art that comprises solid-state capacitors (not shown) and uses galvanic finger contact. As the finger of the user passes from one electrode of a solid-state capacitor to another, movement and direction of the finger are sensed substantially instantaneously.

The positionally variable controller 104 is preferably raised or indented from the surface of the human interface device 100 so that the positionally variable controller 104 is distinguishable from the surface of the human interface device 100. Alternatively, a portion of the touch-sensitive portion 104, such as the portion defining the perimeter of the touch-sensitive portion 104, is preferably raised or indented.

In the first embodiment of the invention, the touch-sensitive portion 104 is geometrically shaped as a rectangle for providing a first reference position 200 and a second reference position 202. The first reference position 200 is preferably used for indicating the first intensity level, such as a minimum intensity of the intensity-variable property of the process. Similarly, the second reference position 202 is preferably used for indicating the second intensity level, such as a maximum intensity of the intensity-variable property of the process. In this way, for example, the user is able to vary the strength of the punch in the combat game by passing his or her fingers over the touch-sensitive portion 104. The touch-sensitive portion 104 advantageously allows the user to respond to situations in which a very quick change in the intensity level of a function in a computer game is necessary.

In a second embodiment of the invention as shown in FIG. 2b, the touch-sensitive portion 104 is geometrically shaped as triangle for providing the first reference position 200 and the second reference position 202. A first apex 204 of the triangularly shaped touch-sensitive portion 104 forms the first reference position 200. A second and third apexes 206, 208 of the triangularly shaped touch-sensitive portion 104 form the second reference position 202.

The geometrical shape of the touch-sensitive portion 104 enhances the user in discerning the intensity level of the intensity-variable property of the process. The triangularly shaped touch-sensitive portion 104 therefore advantageously provides the user with an additional indication of the intensity level of the intensity-variable property of the process.

With reference to FIG. 1, the human interface device 100 also comprises a communication interface 106, such as PS2 or USB as known in the art for communicating with the computing device 102. The computing device 102 preferably varies the intensity level of the intensity-variable property of the process in response to the actuation and position of the positionally variable controller 104.

The human interface device 100 further comprises a process selection key 108 that is actuable by the user of the computing device 102. The process selection key 108 is preferably capable of selecting the process to be performed by the computing device 102.

Alternatively, the human interface device 100 has more than one process selection keys 108 for selecting the process to be performed by the computing device 102. The process selection key 108 is preferably a key on the keyboard. Additionally, the process selection key 108 is preferably capable of varying the intensity level of an intensity-variable property of a gaming function.

The human interface device 100 is preferably capable of sensing sound and vibration generated by the user. The human interface device 100 preferably converts the sound and vibration generated by the user into signals for communicating with the computing device 102 via the communication interface 106.

With reference to FIG. 3, a flow diagram of a method 300 for varying a process performable by the computing device 102 is shown. The method 300 is performed in the human interface device 100 as shown in FIG. 1 that is communicable with the computing device 102.

The method 300 involves a step 302 of detecting actuation of the positionally variable controller 104 of the human interface device 100 by a user of the computing device 102 as shown in FIG. 1.

The method also involves a step 304 of detecting position of the positionally variable controller 104 in response to the actuation of the positionally variable controller 104. The method further involves a step 306 of communicating with the computing device 102 for varying intensity level of an intensity-variable property of the process. The process is selectably performable by the computing device 102 in response to the position of the positionally variable controller 104. More specifically, the process is selectably performable by a process selection key 108 that is actuable by the user of the computing device 102.

In the foregoing manner, a device and method that would allow a user to response to situations where a very quick change in the intensity level of a function in a computer game is necessary is disclosed. Although only a few embodiments of the invention are disclosed, it becomes apparent to one skilled in the art in view of this disclosure that numerous changes and/or modification can be made without departing from the scope and sprit of the invention.

The invention claimed is:

1. In a human interface device communicable with a computing device, a method for varying an intensity-variable property of a process, the process selected for performance by the computing device, the method comprising the steps of:
    detecting actuation of a positionally variable controller of the human interface device;
    determining a position on the positionally variable controller whereat the actuation is detected; and
    communicating with the computing device for varying intensity level of the intensity-variable property of the process selected for performance by the computing device in response to the position of actuation on the positionally variable controller being determined.

2. The method as in claim 1, wherein the human interface device is a mouse.

3. The method as in claim 1, wherein the process selected for performance by the computing device is selectable by at least one process selection key of the human interface device.

4. The method as in claim 1, wherein the process selected for performance by the computing device is selectable by at least one process selection key of a keyboard.

5. The method as in claim 1, wherein the step of detecting actuation of the positionally variable controller of the human interface device by the user of the human interface device comprises the step of:
    detecting actuation of a touch-sensitive portion of the human interface device by the user of the human interface device.

6. The method as in claim 5, wherein the step of detecting actuation of the touch-sensitive portion of the human interface device by the user of the human interface device comprises the step of: detecting actuation of a touch-sensitive portion of the human interface device by the user of the human interface device, the touch-sensitive portion of the human interface device being tactile and shaped for providing a first reference position and a second reference position, the first reference position corresponding to a minimum intensity of the intensity-variable property of the process and the second reference position corresponding to a maximum intensity of the intensity-variable property of the process.

7. The method of claim 1, wherein the process is at least one of a software function, a gaming function and a graphic function.

8. A human interface device communicable with a computing device for varying an intensity-variable property of a process, the process selected for performance by the computing device, the human interface device comprising:
    a positionally variable controller actuable and positionable by a user of the human interface device; and
    a communication interface for communicating with the computing device for varying intensity level of the intensity-variable property of the process selected for performance by the computing device in response to the actuation and position of the positionally variable controller.

9. The human interface device as in claim 8, wherein the human interface device is a mouse.

10. The human interface device as in claim 8, wherein the process selected for performance by the computing device is selectable by at least one process
    selection key of the human interface device actuable by the user of the human interface device.

11. The human interface device as in claim 10, wherein the process selected for performance by the computing device is selectable by at least one process selection key of a keyboard actuable by the user of the human interface device.

12. The human interface device as in claim 8, wherein the positionally variable controller of the human interface device comprises a touch-sensitive portion of the human interface device.

13. The human interface device as in claim 12, wherein the touch-sensitive portion of the human interface device is tactile and shaped for providing a first reference position and a second reference position, the first reference position corresponding to a minimum intensity of the intensity-variable property of the process and the second reference position corresponding to a maximum intensity-variable property of the process.

14. The human interface device as in claim 12, wherein the touch-sensitive portion of the human interface device is triangularly shaped.

15. The human interface device as in claim 12, wherein a first apex of the triangularly shaped touch-sensitive portion of the human interface device forms the first reference position and second and third apexes of the triangularly shaped touch-sensitive portion of the human interface device form the second reference position.

16. The human interface device as in claim 8, wherein the process if at least one of a software function, a gaming function and a graphic function.

* * * * *